United States Patent
Minneman et al.

(10) Patent No.: US 6,784,987 B2
(45) Date of Patent: Aug. 31, 2004

(54) NON-LINEAR RANGING TO CONTROL LINEAR RANGING MEASUREMENT DEVICE

(75) Inventors: Michael Paul Minneman, Broomfield, CO (US); Michael Paul Atwell, Broadview Heights, OH (US); Elwood James Egerton, Longmont, CO (US)

(73) Assignee: DBM Optics, Incorporated, Lafeyette, CO (US)

( * ) Notice: Subject to any disclaimer, the term of this patent is extended or adjusted under 35 U.S.C. 154(b) by 445 days.

(21) Appl. No.: 10/054,012

(22) Filed: Jan. 21, 2002

(65) Prior Publication Data

US 2002/0097392 A1 Jul. 25, 2002

Related U.S. Application Data

(60) Provisional application No. 60/262,887, filed on Jan. 19, 2001, and provisional application No. 60/264,938, filed on Jan. 29, 2001.

(51) Int. Cl.[7] .............................. G01J 1/44; G01J 1/10
(52) U.S. Cl. .................... 356/226; 356/229; 250/214 A
(58) Field of Search ................... 356/213, 218, 356/223, 224, 226, 229; 250/214 A, 214 C; 327/334, 350, 560; 702/64

(56) References Cited

U.S. PATENT DOCUMENTS

| | | | | |
|---|---|---|---|---|
| 4,507,615 A | * | 3/1985 | Bateman | 327/334 |
| 4,785,664 A | * | 11/1988 | Reebs | 73/290 V |
| 5,028,775 A | * | 7/1991 | Furukawa et al. | 250/227.15 |
| 5,241,282 A | * | 8/1993 | Poole | 327/350 |
| 5,491,548 A | * | 2/1996 | Bell et al. | 356/73.1 |
| 5,847,604 A | * | 12/1998 | Dekker | 330/149 |
| 6,417,729 B1 | * | 7/2002 | Lemay et al. | 330/129 |
| 6,456,408 B1 | * | 9/2002 | Moeller | 398/79 |
| 6,614,587 B1 | * | 9/2003 | Yu et al. | 359/337.12 |
| 2004/0044486 A1 | * | 3/2004 | Tignor | 702/64 |

FOREIGN PATENT DOCUMENTS

WO    WO 96/31946    * 10/1996

* cited by examiner

Primary Examiner—Hoa Q. Pham
(74) Attorney, Agent, or Firm—Renner, Otto, Boisselle & Sklar, LLP

(57) ABSTRACT

A range selection circuit (13), including a logarithmic amplifier (23) and output circuitry (25) associated therewith, is configured to directly drive linear ranging circuitry for measurement circuitry (12) in an optical power meter (10) to measure signals that vary over a wide range of, for example, from about −7 dB to about −45 dB. This allows the optical power meter to change ranges as fast as one (1) times the hardware settling time. The range selection circuitry is in parallel with the measurement circuitry, which allows ranging to happen in real time.

21 Claims, 2 Drawing Sheets

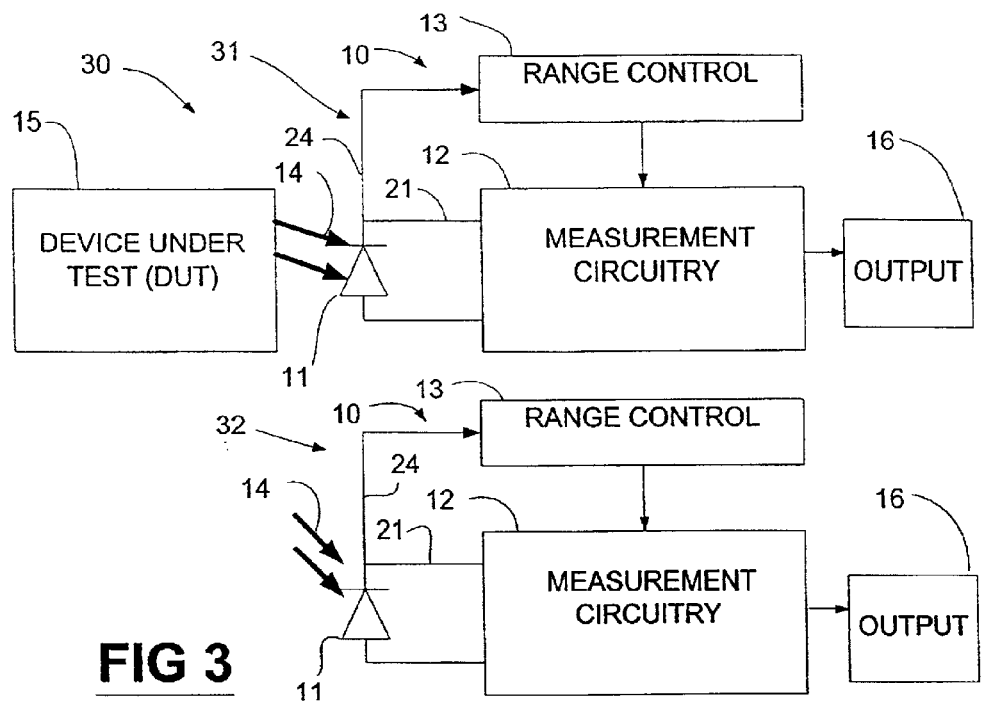
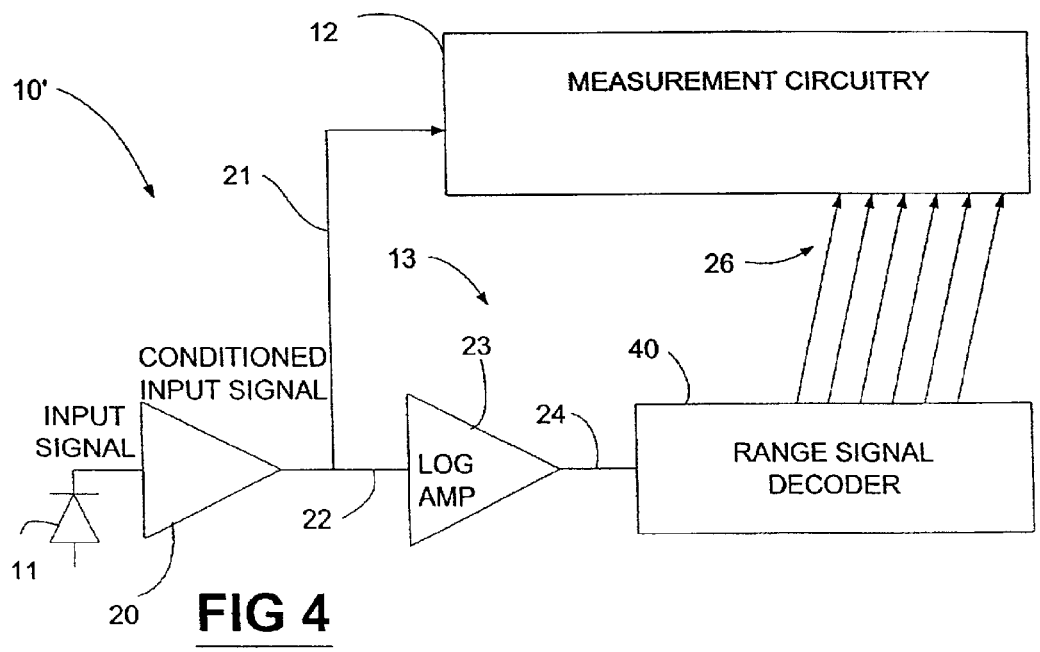
FIG 4

NON-LINEAR RANGING TO CONTROL LINEAR RANGING MEASUREMENT DEVICE

CROSS-REFERENCE TO RELATED APPLICATIONS

This application claims the benefit of U.S. Provisional Application Serial No. 60/262,887, filed Jan. 19, 2001 and U.S. Provisional Application Serial No. 60/264,938, filed Jan. 29, 2001.

TECHNICAL FIELD

This invention relates generally, as indicated, to non-linear ranging to control a linear ranging measurement device, and, more particularly, to apparatus and method employing a non-linear device to select respective ranges of a linear measurement device to measure signals over a wide range of magnitudes.

BACKGROUND

As the use of optical signals continues to increase and the speeds of equipment employing optical signals also increase, improved fast and accurate measurement techniques are needed. Optical signal carriers, such as fiber optic cable, and various connecting, switching, amplifying, and detecting devices require testing. As a present example of measuring speed, in some test instruments measurements are made at the rate of ten thousand or more per second.

An example of an optical test instrument, namely, an optical power meter for detecting loss factors in fiber optic communications, is described in U.S. Pat. No. 5,825,516.

An example of a device to be tested is that known as the Telecom DWDM system, that relies on deep optical filter components, which often reject at 25 dB to 50 dB and more, clearly a rather wide range. In other optical instruments signal strengths vary over an even wider range, e.g., between approximately –7 dB and approximately –45 dB. Validating performance of such devices may be performed using a tunable laser source and an optical power meter. However, conventional test systems, which include an optical power meter and associated measurement instrument, usually are generally linear-ranging instruments, and the range typically changes over three (3) to five (5) ranges, e.g., decades, as signals between 25 dB and 40 dB, for example, are measured. Usually it is desirable for a signal to be measured in the proper range setting of a measurement instrument to obtain the most accurate measurement. For example, usually it is undesirable to measure a small magnitude signal at an upper range of a multiple range measurement instrument because accuracy and resolution would be rather poor; similarly a large magnitude signal would not be measured at a low range because the measurement likely would be off-scale, as is well known. In conventional linear-ranging test systems although accurate measurements can be obtained, the time it takes to determine the correct range and to switch to that range can be a major component of the time required to perform the test and, thus, slows down the overall measurement procedure.

In conventional linear ranging measurement circuitry and in software-based ranging measurement circuitry, usually time is wasted determining the range in which the measurement circuitry should operate to measure signal strength of a given input signal. In a typical case the measurement circuitry measures the input signal using one range, usually that one range is whatever range was used for the last measurement made. The circuitry determines whether the signal is over range, i.e., larger than the measurement circuitry is able to measure while in the present range, and in such case, the ranging mechanism must select a higher range. Similarly, if the measurement demonstrates that the measured signal is below a prescribed level or percent of the signals typically measured in the present range of the measurement circuitry, e.g., below 10% of the largest signals measured at the present range, then a lower range must be selected. After selecting the new range, another measurement is made. If that measurement is in range, the measurement result is acceptable; but if that measurement shows the measured signal is above or below range, as was mentioned before, the range selection step must be repeated until an acceptable range is identified. To make a measurement in a new range, the measurement circuitry must "settle" so that the measurement circuitry is set with the newly selected range of measurement capability. Thus, total measurement time is the settling time times the number of range changes required to reach the proper range, plus the measurement time times the number of range changes. Accordingly, it is desirable to expedite the adjustments in measurement circuitry to reduce the time required for selecting range.

Measurements made using linear range measurement instruments are relatively accurate; but, as ranges must be changed, depending on the magnitude (or signal strength) of the measured signal, operation of such instruments may be relatively slow. Accordingly, there is a need to increase the speed of making such measurements.

In making measurements of signals that vary in magnitude over a relatively wide range, non-linear measurement systems, which include non-linear amplifiers, sometimes have been used. An example of a non-linear amplifier is a logarithmic amplifier. A logarithmic amplifier based measurement instrument may be relatively faster than the linear ranging instruments mentioned above, because ranges do not have to be switched, or at least the number of switched ranges is fewer than for a linear ranging measurement instrument. However, logarithmic amplifiers compress the results of the measurement, which leads to a reduction in accuracy of the measurement, especially when measuring relatively smaller signals in the large range over which a signal magnitude or signal strength may vary. Accordingly, there is a need to improve the accuracy of such measurements.

Summarizing, then, linear ranging measurement devices tend to be more sensitive and/or accurate than non-linear measurement devices; and non-linear measurement devices tend to be faster than linear ranging measurement devices. Thus, there is a need for increasing the speed of making measurements while maintaining a high level of sensitivity and accuracy.

SUMMARY

Briefly, according to an aspect of the present invention a non-linear amplifier drives linear ranging circuitry in a measurement instrument.

According to another aspect a non-linear ranging device is used to control a linear ranging measurement device.

According to another aspect, a non-linear amplifier circuit and a linear optical power meter are cooperative in response to an input signal such that the non-linear amplifier circuit drives linear ranging circuitry of the optical power meter to set the linear measuring range thereof.

Another aspect relates to quickly and accurately measuring signals of the type wherein the signal strength varies over a wide range.

Another aspect is to provide a wide dynamic range for measurement circuitry.

Another aspect is to measure signals of the type wherein the signal strength may vary over a wide range, for example, say from about −7 dB to about −45 dB, wherein accurate measurements can be obtained for small and large signals, and wherein the measurements can be made relatively fast.

Another aspect relates to apparatus for measuring signals over a large range, including measurement circuitry to measure signals, the measurement circuitry having a number of respective ranges, and a range selector, including a non-linear amplifier to select the range of the measurement circuitry based on the magnitude of the signal to be measured.

Another aspect relates to apparatus for measuring signals over a large range, including measurement circuitry to measure signals, the measurement circuitry being substantially linear-ranging and having a number of respective ranges, and a range selector, including a non-linear amplifier to select the range of the measurement circuitry based on the magnitude of the signal to be measured.

Another aspect relates to apparatus for measuring signals over a large range, including measurement circuitry to measure signals, the measurement circuitry having a number of respective ranges, and a range selector, including a logarithmic amplifier to select the range of the measurement circuitry based on the magnitude of the signal to be measured.

Another aspect relates to an optical power meter, including measurement circuitry for measuring electrical signals representative of detected light over a wide range of optical power, including ranging circuitry to determine respective ranges of the optical power measured, and a non-linear selector in parallel with the measurement circuitry to control operation of the ranging circuitry to select the measuring range of the measurement circuitry in response to magnitude of the signal to be measured.

Another aspect relates to a range selector for measurement circuitry useful to measure inputs having a wide range of variation over a number of orders of magnitude, including a non-linear amplifier providing an output in response to an input representative of a signal to be measured, and range selection circuits responsive to the non-linear amplifier to provide range selection signals for use to select operating range of such measurement circuitry.

Another aspect relates to a high speed range selector for optical power measuring apparatus including measurement circuitry having ranging circuitry and operable to measure signals over a number of substantially or relatively linear ranges, characterized in that a non-linear means responsive to the magnitude of the signal to be measured provides an input to determine the range selected by the ranging circuitry.

Another aspect relates to a method of selecting the measuring range of measurement circuitry used to measure an input, including using a non-linear representation of the input to select the measuring range of the measurement circuitry.

Another aspect relates to a method of measuring a signal having a large dynamic range using measurement circuitry having plural ranges, including compressing the dynamic range of the measured signal for measurement by the measurement circuitry operative in a respective range.

Another aspect relates to an optical component spectrum analyzer, including a measuring system for measuring incident light, the measuring system having a number of substantially linear operative ranges representative of optical power of the incident light over which such incident light is measurable, a logarithmic amplifier responsive to a representation of the optical power of the incident light for providing a non-linear output representative of such optical power, and comparator circuitry responsive to such non-linear output for selecting the operative range of the measuring system.

A number of features are described herein with respect to embodiments of the invention; it will be appreciated that features described with respect to a given embodiment also may be employed in connection with other embodiments.

The invention comprises the features described herein, including the description, the annexed drawings, and, if appended, the claims, which set forth in detail certain illustrative embodiments. These embodiments are indicative, however, of but a few of the various ways in which the principles of the invention may be employed.

Although the invention is shown and described with respect to illustrative embodiments, it is evident that equivalents and modifications will occur to those persons skilled in the art upon the reading and understanding hereof. The present invention includes all such equivalents and modifications and is limited only by the scope of the claims if appended hereto.

BRIEF DESCRIPTION OF THE DRAWINGS

In the annexed drawings:

FIG. 3 is a schematic illustration of an optical testing instrument including a number of optical power meters according to the invention; and FIG. 4 is a schematic circuit diagram, similar to FIG. 2, showing a generic range signal decoder to provide range signals to the measurement circuitry in response to the output form a non-linear amplifier.

DESCRIPTION

Figure 1:
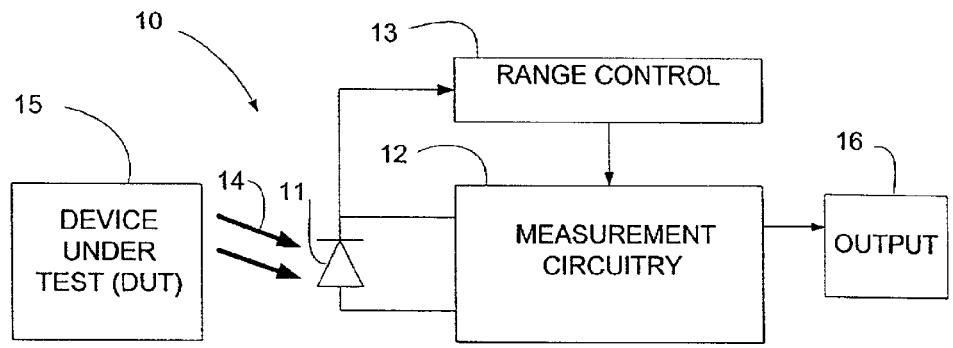
FIG. 1 is a schematic illustration of measurement circuitry according to the invention.

Referring in detail to the drawing, wherein like reference numerals designate like parts in the several figures, and initially to FIG. 1, an optical power meter and measurement circuitry according to the invention is generally indicated at 10. The optical power meter and measurement circuitry 10 includes a light detector 11, measurement circuitry 12 and range selection circuit 13. The optical power meter and measurement circuitry 10 measures light 14 received from a device under test 15 (DUT).

The device under test may be any of a variety of devices in which optical signals are used, developed, conducted, switched, etc. The device under test may be a fiber optic device, such as a fiber optic cable, individual optical fiber, multiplexer, optical switch or cross connect device, or other optical source, optical device, and/or optical communication device, system or component or communication to, in and/or from another computing device. The light 14 provided by the device under test 15 for measurement by the optical power meter and measurement circuitry 10 may be a single wavelength, more than one wavelength, etc., and may be in a narrow or broad spectrum range, for example, in the visible range, in a range that is other than visible, or in a range that is partly visible and/or partly other than visible, etc.

The range selection circuit 13 is coupled to the detector 11 and in parallel relation to the measurement circuitry 12 to set the range of the measurement circuitry according to the magnitude of the light signal detected by the detector 11. As was mentioned, it is anticipated that the signal strength of the light signal may vary over a wide range, and the cooperative relation of the measurement circuitry 12 and the range selection circuit 13, which receive the conditioned signal that is proportionally representative of the light signal, allows for fast, accurate measurement of the light signal. Accordingly, the range selection circuit 13 is a non-linear circuit able to respond to a wide range of signal strengths detected by the detector 11 and to set the measuring range of the linear-ranging measurement circuitry 12 allowing the measurement circuitry to maintain good sensitivity while measuring signals with good accuracy, as is described in further detail below with respect to FIG. 2.

Output device 16 may be used for several purposes. One example, is a meter that displays the signal strength values measured by the measurement circuitry 12 or some other values measured by the measurement circuitry. The output 16 may be a computer that stores, uses and/or analyzes data from the measurement circuitry. The output 16 may be a display, such as a liquid crystal display, cathode ray tube display, or other display that displays the data graphically, numerically or both. The output 16 may take other forms, too, as is known in the art and may be developed in the future.

The present invention utilizes a non-linear amplifier described further below and associated circuitry configured to directly drive linear ranging circuitry in the measurement circuitry 12. This arrangement allows the optical power meter to change ranges relatively fast, for example, as fast as one (1) times the hardware settling time. Using the non-linear range selection circuit 13 in parallel with the linear-ranging measurement circuitry 12 to select the linear ranging thereof, ranging happens in real time. Therefore, the sometimes long cycles required for range setting using conventional software based ranging or using exclusively linear hardware ranging approaches are not encountered.

Figure 2:
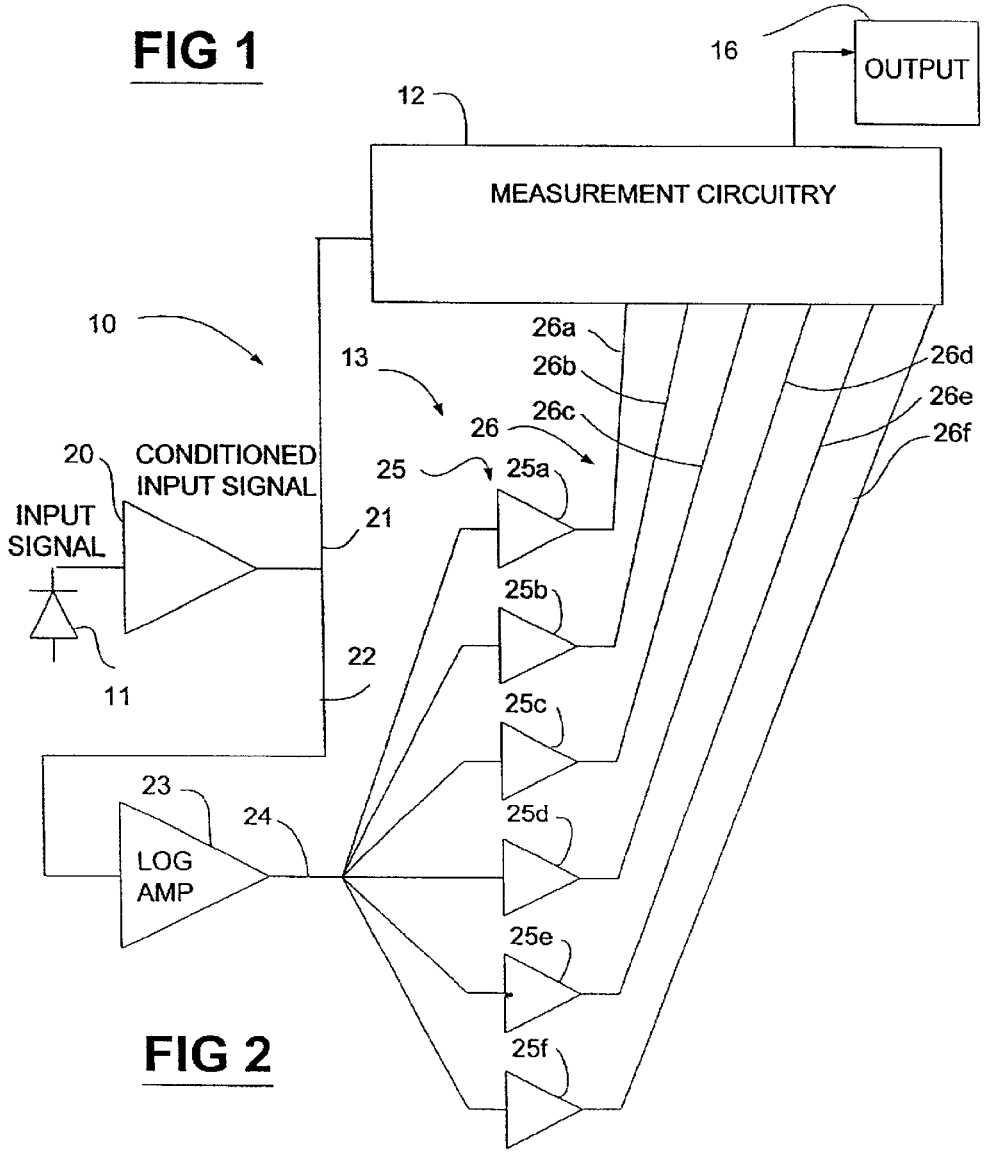
FIG. 2 is a schematic circuit diagram that provides non-linear ranging to control a linear ranging measurement device according to the invention.

The range selection circuit 13 is illustrated in greater detail in FIG. 2 in the optical power meter and measurement circuitry 10. An input signal in the form of light 14 (FIG. 1) impinging on the detector 11 causes an electrical signal produced by the detector. The electrical signal from the detector 11 is conditioned by an appropriate amplifier or pre-amplifier circuit 20 and is provided by lines 21, 22 as an input signal, which is proportionally representative of the light signal strength, simultaneously to the parallel connected measurement circuitry 12 and the range selection circuitry 13. The measurement circuitry 12 and the range selection circuit 13 are connected in parallel, which contributes to the increased speed of the range selecting function and making of measurements, compared to prior ranging systems.

The measurement circuitry 12 may be conventional measurement circuitry for the signals intended to be measured by the optical power meter and measurement circuitry 10. Several examples of such measurement circuitry are mentioned above, and others also exist. In an embodiment of the present invention the measurement circuitry is of the type which includes linear ranging capability to obtain good accuracy in the measurements, for example, compared to some measurement circuitry that use non-linear measurement techniques, which may have reduced accuracy at certain signal ranges, for example, at lower signal strengths.

In the range selection circuit 13 illustrated, the non-linear amplifier 23 is a logarithmic amplifier. The logarithmic amplifier 23 receives the conditioned input signal on line 22 and provides its output on line 24 as an input to a number of parallel connected comparators 25a–25f (collectively designated by reference numeral 25).

The respective outputs 26a–26f (collectively referred to as output 26) from each of the comparators 25 are coupled to the measurement circuitry 12 to select the range of the measurement circuitry. The range can be selected by an appropriate logic circuit in the measurement circuitry 12. The range can be selected using appropriate analog or digital circuitry able to respond to the output from the non-linear amplifier 23 to provide to the measurement circuitry 12 a signal of the type to which the linear-ranging circuitry thereof can respond. The range may be selected by software that responds to a digital word composed by signals on the outputs 26 from the comparators 25. In any event, though, the outputs from the comparators 25 in effect are range selection signals that determine the range setting of the measurement circuitry 12 to measure the signal then being detected by the detector 11. The number of comparators 25 and/or their arrangement along with logic decoding circuitry, software or the like may be coordinated with the number of different ranges that can be selected in the measurement circuitry 12.

In an exemplary embodiment of the invention, the conditioned input signal provided by the detector 11 and pre-amplifier 20 to the lines 21–22 may vary over several orders of magnitude, for example five or six, say, from on the order of about 1 to about 100,000 or even 1,000,000, or still greater. The logarithmic amplifier 23 may in effect compress the input signal thereto, which varies over a range of 1 to 100,000, so that the output signal therefrom varies over a range of, for example, 1 to 50. The output signal from the logarithmic amplifier 23 triggers respective comparators to switch the range of the measurement circuitry at decade intervals (or at some other intervals, as may be desired). Thus, for example, only the comparator 25a may be triggered to produce a prescribed output when the output from the logarithmic amplifier 23 is below (or perhaps is either at or below) a prescribed magnitude, such as, for example, 10% of the maximum output from the logarithmic amplifier. The other comparators 25b–25f would be triggered at different respective percentages of the maximum output signal from the logarithmic amplifier 23. The output signal from the logarithmic amplifier would be representative of the signal to be measured, e.g., the output from the pre-amplifier 20 or the light signal impinging on the detector 11.

In an exemplary embodiment the number of comparators that are triggered will represent and determine the range setting for the measurement circuitry 12. Alternatively, if the comparators are set up so only one comparator would be triggered exclusively, then that sole comparator would be the controlling factor for setting the range in the measurement circuitry 12.

As will be appreciated, the comparators 25 may be set up to provide a prescribed output when the magnitude of the logarithmic amplifier 23 (or other non-linear device) provides an output that is a given value or a given range of values. The comparators 25 may be set up so that when the signal to be measured is within one range only a single comparator provides the prescribed output to set the range of the measurement circuit 12 and when the signal to be measured is in a different range only a different single comparator provides the prescribed output. Alternatively, the comparators may be set up so that for one or more of the ranges several comparators provide the prescribed output to set the range of the measurement circuitry.

It also will be appreciated that although the invention is disclosed using comparators 25 to respond to the output form the non-linear amplifier 23 (or other non-linear device), other devices, such as logic circuits, threshold detecting circuits, digital voltmeters, or other analog or digital devices or circuits may be used to respond to the non-linear device to provide an input to the measurement circuitry 12 to set the range thereof.

Although the range selecting circuit 13 is illustrated and described with respect to a logarithmic amplifier 23, it will be appreciated that the amplifier 23 may be another non-linear device. Such non-linear device is able to respond to the input signal, to compress that input signal and to provide appropriate inputs to the comparators 25 so they can operate to cause the measurement circuitry to select the appropriate range for measuring the input signal.

The optical power meter and measurement circuitry 10 operates in relatively short time to select the range of the measurement circuitry 12 and to measure the input signal. The amplifier 23, whether logarithmic or otherwise non-linear, compresses the range of its input signal so the comparators can be set to operate in parallel easily and promptly to trigger and thereby to set the range of the measurement circuitry 12 so accurate and prompt measurement can be made of the input signal.

For convenience, measurement circuitry 12 may include ranging in respective decades, as is conventional, or the ranging my be in other increments. Therefore the amplifier 23 and comparators 25 are coordinated to affect, select, control or adjust the ranging circuitry in the measurement circuitry 12 at respective decades in accordance with the signal strength of the input signal detected by the detector 11. In a sense the range selection circuit 13 uses the non-linear function of the amplifier 23 to compress the dynamic range of the measured signal and to control the measurement circuitry so that the measured signal is measured at an appropriate range setting of the measurement circuitry. Thus, the combination of the non-linear range selection circuitry 13 to select the measuring range of a linear-ranging measurement circuitry 12 in effect improves the dynamic range of the optical power meter and measurement circuitry 10. The ranges of the measurement circuitry may be substantially linear or in any event may be relatively linear ranges compared, for example, to those ranges encountered in non-linear measuring instruments, such as logarithmic measuring instruments or the like.

Thus, the linear ranging effected in the measurement circuitry 12 by the range selection circuit 13 allows for fast, accurate measuring of input signals that vary over wide ranges.

Briefly referring to FIG. 3, an optical testing apparatus 30 is illustrated. The optical testing apparatus has a number of measuring channels 31, 32 for measuring simultaneously or substantially simultaneously light 14 from different respective optical channels of the device under test 15 or light from different optical devices, etc. Although only two measuring channels are illustrated, it will be appreciated that there may be more than two channels. Each measuring channel includes an optical power meter and measurement circuitry 10 of the type described herein, which function as was described above. Although the outputs 16 are shown separately for each measuring channel, it will be appreciated that the output data may be combined for several of the measuring channels for use in data analysis by a computer, storage, graphical display, comparison, or other purpose.

Briefly referring to FIG. 4, a modified optical power meter and measurement circuitry 10' is illustrated. In this embodiment a range signal decoder 40 is used to respond to the output from the non-linear device 23 (here illustrated as a logarithmic amplifier). The range signal decoder 40 responds to or decodes the output from the logarithmic amplifier and provides a direct input to the linear-ranging circuitry in the measurement circuitry to select the operational range of the measurement circuitry to obtain an accurate measurement of the input signal. It will be appreciated that the range signal decoder 34 may be any of a number of devices, for example, comparators as were described above, analog or digital logic circuitry, a computer for decoding the output from the logarithmic amplifier 23 to provide the range selection for the measurement circuitry, etc.

INDUSTRIAL APPLICATION

The present invention may be used to measure signals, for example, optical signals.

We claim:

1. An apparatus for measuring signals over a large range, comprising
   measurement circuitry to measure signals, the measurement circuitry having a number of respective ranges, and
   a range selector, including
      a non-linear amplifier to select the range of the measurement circuitry based on the magnitude of the signal to be measured.

2. The apparatus of claim 1, wherein the non-linear amplifier is a logarithmic amplifier.

3. The apparatus of claim 1, wherein the range selector includes a number of comparators responsive to the non-linear amplifier to select range of the measurement circuitry.

4. The apparatus of claim 1, wherein the measurement circuitry is linear-ranging measurement circuitry.

5. The apparatus of claim 1, wherein said non-linear amplifier compresses the dynamic range of the measured signal for determining the range of the measurement circuitry.

6. The apparatus of claim 1, further comprising a light detector responsive to an optical input signal variable over a wide signal strength range.

7. The apparatus of claim 6, further comprising a preamplifier for amplifying signals from the light detector.

8. The apparatus of claim 6, wherein the measurement circuitry and the range selector are connected in parallel to receive substantially simultaneously as an input a signal a signal proportionally representative of light incident on the light detector.

9. An optical power meter comprising the apparatus of claim 8.

10. An optical measuring instrument comprising a plurality of the optical power meters of claim 9 for measuring substantially simultaneously respective optical inputs.

11. An optical power meter, comprising
    measurement circuitry for measuring electrical signals representative of detected light over a wide range of optical power, including
       ranging circuitry to determine respective ranges of the optical power measured, and
    a non-linear selector in parallel with the measurement circuitry to control operation of the ranging circuitry to select the measuring range of the measurement circuitry in response to magnitude of the signal to be measured.

12. A range selector for measurement circuitry useful to measure inputs having a wide range of variation over a number of orders of magnitude, comprising a non-linear amplifier providing an output in response to an input representative of a signal to be measured, and range selection circuits responsive to the non-linear amplifier to provide range selection signals for use to select operating range of such measurement circuitry.

13. The range selector of claim 12, wherein a plurality of the ranges are linear.

14. The range selector of claim 13, wherein are respective decades.

15. A high speed range selector for optical power measuring apparatus including measurement circuitry having ranging circuitry and operable to measure signals over a number of substantially linear ranges, characterized in that a non-linear means responsive to the magnitude of the signal to be measured provides an input to determine the range selected by the ranging circuitry.

16. An optical component spectrum analyzer, comprising a measuring system for measuring incident light, the measuring system having a number of substantially linear operative ranges representative of optical power of the incident light over which such incident light is measurable, a logarithmic amplifier responsive to a representation of the optical power of the incident light for providing a non-linear output representative of such optical power, and comparator circuitry responsive to such non-linear output for selecting the operative range of the measuring system.

17. A method of selecting the measuring range of measurement circuitry used to measure an input, comprising using a non-linear representation of the input to select the measuring range of the measurement circuitry.

18. The method of claim 17, said using comprising using a logarithmic amplifier to sense the magnitude of signals to be measured and based on that sensing selecting a linear measuring range of the measurement circuitry.

19. A method of measuring a signal having a large dynamic range using measurement circuitry having plural ranges, comprising compressing the dynamic range of the measured signal for measurement by the measurement circuitry operative in a respective range.

20. The method of claim 19, wherein the measurement circuitry comprises linear-ranging measurement circuitry and further comprising using the compressed measured signal to select the range of the measurement circuitry.

21. The method of claim 20, said compressing comprising using a logarithmic amplifier to amplify an input signal that varies over a wide range to provide a compressed signal for selecting the range of the measurement circuitry.

* * * * *